United States Patent
Huang

(10) Patent No.: US 10,708,350 B2
(45) Date of Patent: *Jul. 7, 2020

(54) METHOD AND SYSTEM FOR CONTENT DELIVERY OF MOBILE TERMINAL APPLICATIONS

(71) Applicant: WANGSU SCIENCE & TECHNOLOGY CO., LTD., Shanghai (CN)

(72) Inventor: Zhongwang Huang, Shanghai (CN)

(73) Assignee: WANGSU SCIENCE & TECHNOLOGY CO.,LTD., Shanghai (CN)

( * ) Notice: Subject to any disclaimer, the term of this patent is extended or adjusted under 35 U.S.C. 154(b) by 24 days.

This patent is subject to a terminal disclaimer.

(21) Appl. No.: 16/223,360

(22) Filed: Dec. 18, 2018

(65) Prior Publication Data

US 2019/0124140 A1 Apr. 25, 2019

Related U.S. Application Data

(63) Continuation of application No. 15/533,561, filed as application No. PCT/CN2015/086979 on Aug. 14, 2015, now Pat. No. 10,200,465.

(30) Foreign Application Priority Data

Jun. 19, 2015 (CN) .......................... 2015 1 0345155

(51) Int. Cl.
*G06F 15/173* (2006.01)
*H04L 29/08* (2006.01)
*H04W 88/02* (2009.01)

(52) U.S. Cl.
CPC ............ *H04L 67/104* (2013.01); *H04L 29/08* (2013.01); *H04L 67/06* (2013.01); *H04L 67/2842* (2013.01); *H04W 88/02* (2013.01)

(58) Field of Classification Search
CPC ............................. H04L 67/104; H04L 29/08
See application file for complete search history.

(56) References Cited

U.S. PATENT DOCUMENTS 7,966,293 B1 * 6/2011 Owara ................ G06F 11/1448
707/654
8,196,032 B2 6/2012 Hua et al.
(Continued)

FOREIGN PATENT DOCUMENTS

| CN | 1535036 A | 10/2004 |
|----|-----------|---------|
| CN | 101051913 A | 10/2007 |

(Continued)

OTHER PUBLICATIONS

The European Patent Office (EPO) The Partial European Search Report for 158953491 dated Feb. 23, 2018 22 Pages.
(Continued)

*Primary Examiner* — Thanh T Nguyen
(74) *Attorney, Agent, or Firm* — Anova Law Group, PLLC

(57) ABSTRACT

System and mobile terminal for content delivery are provided. The system includes a plurality of mobile terminal application modules, each mobile terminal application module being embedded with a software development kit (sdk), the sdk being configured to determine whether data download satisfies a start condition of P2P download, implement the P2P download, provide forwarding of response data, and provide data sharing. The system further includes a P2P controller, communicating with the plurality of mobile terminal application modules, the P2P controller being configured to manage the sdk, manage and recommend available peers, search resources for download, and aid NAT traversal of the P2P download.

18 Claims, 5 Drawing Sheets

(56) References Cited

U.S. PATENT DOCUMENTS

| | | | |
|---|---|---|---|
| 8,321,921 B1* | 11/2012 | Ahmed | G06F 21/00 |
| | | | 726/5 |
| 8,706,800 B1* | 4/2014 | Ahmed | G06F 9/468 |
| | | | 709/201 |
| 10,039,029 B2* | 7/2018 | Luna | H04W 28/10 |
| 10,091,734 B2* | 10/2018 | Luna | H04W 52/0254 |
| 10,467,564 B2* | 11/2019 | Hull | H04W 4/029 |
| 2007/0038567 A1 | 2/2007 | Allaire et al. | |
| 2007/0129076 A1 | 6/2007 | Cho et al. | |
| 2007/0162749 A1* | 7/2007 | Lim | G06F 21/6227 |
| | | | 713/167 |
| 2008/0183853 A1 | 7/2008 | Manion et al. | |
| 2010/0198730 A1* | 8/2010 | Ahmed | G06F 21/6209 |
| | | | 705/50 |
| 2011/0252145 A1 | 10/2011 | Lampell et al. | |
| 2012/0136936 A1 | 5/2012 | Quintuna | |
| 2012/0190386 A1 | 7/2012 | Anderson | |
| 2014/0059168 A1 | 2/2014 | Ponec et al. | |
| 2014/0280642 A1 | 9/2014 | Oldenborgh et al. | |
| 2017/0124303 A1 | 5/2017 | Baldwin et al. | |
| 2017/0339220 A1 | 11/2017 | Huang | |
| 2018/0077442 A1 | 3/2018 | Herz | |

FOREIGN PATENT DOCUMENTS

| | | |
|---|---|---|
| CN | 101729583 A | 6/2010 |
| WO | 2009101443 A2 | 8/2009 |

OTHER PUBLICATIONS

The World Intellectual Property Organization (WIPO) International Search Report for PCT/CN2015/086979 dated Mar. 16, 2016 6 pages.

\* cited by examiner

METHOD AND SYSTEM FOR CONTENT DELIVERY OF MOBILE TERMINAL APPLICATIONS

CROSS-REFERENCES TO RELATED APPLICATIONS

This patent application is a continuation of U.S. patent application Ser. No. 15/533,561, which is a national phase entry under 35 U.S.C § 371 of PCT Application No. PCT/CN2015/086979 filed on Aug. 14, 2015, which claims priority of Chinese patent application No. 201510345155.3, filed on Jun. 19, 2015, the entire content of all of which is incorporated herein by reference.

FIELD OF THE DISCLOSURE

The present disclosure generally relates to the field of content delivery based on mobile network, more particularly, relates to a method and a system for content delivery of mobile terminal applications.

BACKGROUND

With the development of mobile network, bandwidth of wireless network has become higher, and rich media applications grow accordingly. Rich media content such as audio and video often requires a fairly large amount of space and is highly dependent on support of content delivery system to ensure the user experience using these rich media applications under mobile networks. Existing centralized content delivery systems often deploy cache systems near users. By changing the forwarding of domain name, requests can be directed into the cache systems. Thus, content can be obtained from the nearby cache systems and less burden may be imposed on the source station. However, existing centralized content delivery schemes have certain shortcomings. For example, an existing centralized content delivery system is often susceptible to bottleneck issues when the amount of user requests is large, causing a decrease in availability and impaired user experience. In addition, the conventional centralized content delivery scheme may be susceptible to single point failure. Also, a centralized content delivery network scheme requires considerably high delivery cost.

Peer-to-peer (P2P) technology has become a considerably mature technology, and has been widely used for content delivery in fixed networks. P2P refers to point to point transmission of data, where the "point" here indicates a user terminal. In the conventional centralized content delivery system, a user can only obtain resources from the source station or the cache system. According to the P2P technology, a user can obtain data from another user terminal that already has the resources. Thus, distributed downloading of data can be implemented, and the shortcomings of the centralized content delivery system can be resolved.

If the P2P technology can be applied under mobile networks, the content delivery system under mobile networks can be more efficient. However, mobile networks and fixed networks are quite different, and the conventional P2P technology used in fixed networks is not suitable for mobile network applications. The reasons may be described in the following aspects.

Firstly, a mobile network has high delay and high amounts of network jitter, and is more unstable compared to fixed networks. In this situation, conventional P2P technology is not able to ensure the timely supply of data. For example, the initial packet is not timely sent out, and user experience cannot be effectively ensured.

Secondly, P2P often requires data sources (P2P technology refers to a data source as a seed) to be permanently online. However, a mobile terminal depends on battery power, and each mobile platform often restricts data usage of backstage applications to conserve power usage. Under such condition, seed service is not reliably guaranteed, and availability can be affected accordingly.

Further, mobile network carriers charge for mobile traffic use, and conventional P2P scheme is not able to distinguish between chargeable traffic and free traffic. As a result, a higher usage cost can be imposed on a user terminal.

Thus, a method and a system, capable of overcoming the abovementioned shortcomings and suitable for P2P content delivery of mobile smart terminal applications, are desired.

BRIEF SUMMARY OF THE DISCLOSURE

The present disclosure is intended to solve the following problems.

Firstly, the conventional P2P content delivery scheme makes the data source marginal. However, due to the limitations of mobile networks and mobile terminals, it is hard to maintain the status of the data source to be always online.

Secondly, mobile networks are relatively unstable, and data may not be obtained from a specific terminal in time. As a result, user experience can be affected.

Further, the conventional P2P content delivery scheme does not recognize chargeable traffic and free traffic, and can cause a higher usage cost of the user.

Lastly, the conventional P2P content delivery scheme does not take into account the usage of the battery of the terminal, causing the battery to be consumed too fast.

To solve the abovementioned problems, the present disclosure combines the features of mobile networks and provides an improved P2P content delivery scheme suitable for mobile networks. The new scheme mainly combines the advantages of centralized delivery scheme and P2P content delivery scheme and avoids the shortcomings of the two schemes. Thus, the content delivery under mobile networks is more reliable and more efficient, and improved user experience can be ensured.

The present disclosure provides a method for content delivery used in a mobile terminal application, including the following steps.

A. integrating, by the mobile terminal application, a software development kit (sdk) into the mobile terminal application, importing a download request into the sdk, and waiting to receive downloaded data;

B. receiving, by the sdk, the download request imported by the mobile terminal application, downloading an initial packet from a cache system or a source station based on the download request, and determining if P2P download can be started based on the initial packet, the initial packet being an initial data fragment of data to be downloaded;

C. when it is determined to start the P2P download, fragmenting, by the sdk, remaining undownloaded data into a plurality virtual files;

D. sequentially downloading, by the sdk, the plurality of virtual files and caching a download result until downloading of all of the virtual files is completed, wherein, during downloading of the virtual files, the sdk forwards downloaded virtual files to the mobile terminal application in real-time; and E. during the downloading of the virtual files, sharing, by the sdk, resources that are downloaded and cached based on a sharing strategy.

In one embodiment, importing a download request into the sdk by the mobile terminal application in step A includes applying one of an active proxy method and a passive hijacking method.

In one embodiment, downloading of the virtual files in step D includes: using an http protocol to download the virtual files from the source station or the cache system and/or using a P2P method to download, wherein the sdk calculates a download speed using the http protocol and a download speed using the P2P method, and determines a method to download a current virtual file based on a demand of data by the mobile terminal application; when the current virtual file cannot be downloaded through the P2P method or the download speed using the P2P method does not meet a regular demand of the mobile terminal application, and the download speed using the P2P method is lower than the download speed using the http method, using the http protocol to directly download the current virtual file from the cache system or the source station, otherwise using the P2P method to download data of the current virtual file.

In one embodiment, the sharing strategy in step E includes: based on a network standard of a mobile terminal, a remaining battery power of the mobile terminal, a usage of RAM of the mobile terminal, and a usage of CPU of the mobile terminal, determining whether the downloaded data can be used as seed for sharing; when the downloaded data is suitable as seed for sharing, registering data sharing, and waiting to receive download requests from other mobile terminal applications.

In one embodiment, determining when P2P download can be started in step B includes: based on a file length and a transfer encoding type of the data in the initial packet, determining whether P2P download can be started, when condition is not satisfied, sending an http request to the cache system or the source station to download the remaining undownloaded data; and when the condition is satisfied, executing step C.

In one embodiment, obtaining a demand of data by the mobile terminal application includes: providing, by the sdk, a data-usage-status notification interface to the mobile terminal application to obtain a current consumption of data by the mobile terminal application.

The present disclosure further provides a system for content delivery in a mobile terminal application, including: a plurality of mobile terminal application modules, each mobile terminal application module being embedded with a software development kit (sdk), the sdk being configured to determine whether data download satisfies a start condition of P2P download, implement the P2P download, provide forwarding of response data, and provide data sharing; and a P2P controller, communicating with the plurality of mobile terminal application modules, the P2P controller being configured to manage the sdk, manage and recommend available peers, search resources for download, and aid NAT traversal of the P2P download.

In one embodiment, the sdk includes: a P2P scheduling layer module and a P2P protocol layer module, the P2P scheduling layer module and the P2P protocol layer module having interactive communication with one another; the P2P scheduling layer module including: a local proxy interface module, configured to import a data download request from a mobile terminal application module into the sdk, and forward downloaded data to the mobile terminal application module through the local proxy interface module; a notification interface module, configured to receive notifications associated with a status of the mobile terminal application module; a download controller, configured to determine whether the data download request satisfies the start condition of the P2P download, and determine whether http download or the P2P download is to be used to download a next fragment of virtual file based on configuration or current condition; an upload controller, configured to determine whether current cached data can be shared and a condition for sharing; and a cache controller, configured to manage a local cache, managing of the local cache including controlling a scale of caching, sorting a hotness of cached data and deleting the cached data, and managing a reuse of cache by the mobile terminal application module.

In one embodiment, the P2P protocol layer module includes: a P2P content search module, configured to implement an interactive management of the sdk and the P2P controller, entering and exiting of the mobile terminals, searching of downloaded content, and processing of recommendations and updates of peers by the P2P controller; a P2P fragmentation task managing module, configured to implement task management of registered P2P files and concurrently management of fragments, to realize optimized P2P download; a P2P NAT traversal control module, configured to ensure links among the peers can be established; and a peer interactive protocol module, configured to facilitate communication protocols among the peers.

In one embodiment, the P2P controller includes: a peer managing module, configured to record and manage activities of the peers; a peer recommending module, configured to recommend a proper and healthy peer list containing specific resources to a requestor that requests for data download; a NAT traversal aiding module, configured to aid a peer terminal to determine a NAT environment of the peer terminal, and provide communication aid to establish connection among peers; and a sdk configuring-aiding module, configured to configure and manage the sdk.

In one embodiment, the download controller being configured to determine whether the data download request satisfies the start condition of the P2P download includes: based on a file length and a transfer encoding type of the data described in an initial packet, determining, by the download controller, whether the P2P download can be started, when condition is not satisfied, sending an http request to a cache system or a source station to download remaining undownloaded data; and when the condition is satisfied, starting the P2P download.

In one embodiment, the download controller determining using http download or P2P download to download a next fragment of virtual file based on configuration or current condition includes: calculating, by the download controller, a download speed using an http method and a download speed using a P2P method, and determining a method to download a current virtual file based on a demand of data by the mobile terminal application; when a virtual file cannot be downloaded using the P2P method or the download speed using the P2P method does not meet a regular demand of the mobile terminal application, and the download speed using the P2P method is lower than the download speed using the http method, using the http method to directly download the current virtual file from the cache system or the source station, otherwise using the P2P method to download data of the current virtual file.

In one embodiment, based on a network standard of the mobile terminal, a remaining battery power of the mobile terminal, a usage of RAM of the mobile terminal, and a usage of CPU of the mobile terminal, the upload controller determines whether the downloaded data can be used as seed for sharing; when the downloaded data is suitable for sharing, registering data for sharing, and waiting to receive download requests from other mobile terminal applications.

The present disclosure further provides a mobile terminal for a content delivery in a mobile network. The mobile terminal contains a mobile terminal application. The mobile terminal application includes a system for the content delivery. The system includes a plurality of mobile terminal application modules, each mobile terminal application module being embedded with a software development kit (sdk), the sdk being configured to determine whether data download satisfies a start condition of P2P download, implement the P2P download, provide forwarding of response data, and provide data sharing; and a P2P controller, communicating with the plurality of mobile terminal application modules, the P2P controller being configured to manage the sdk, manage and recommend available peers, search resources for download, and aid NAT traversal of the P2P download.

The advantages of the present disclosure include the follows.

Firstly, the present disclosure has strong versatility and fairly low coupling with applications. Apps can be used transparently without changing the service logic.

Secondly, the present disclosure combines with the features of smart mobile terminals, so that user experience can be ensured when P2P delivery is completed.

Further, the present disclosure can maximize the download speed of P2P download and ensure the timeliness of download through smart analysis.

In addition, the P2P module can reuse the cache of the P2P module to provide P2P sharing, so that performance and storage capacity of the mobile terminal can be less consumed.

Because terminal application shares the load of the central caching system, the central caching system is less susceptible to single point malfunctions or single point bottlenecks.

In addition, the realization scheme provided in the present disclosure utilizes sdk to implement the integration of P2P delivery functions of mobile terminals, and has a low degree of coupling with the specific service of the terminal. At least two advantages may be provided.

The degree of coupling with service is fairly low, which make is suitable for rapid integration with different service terminals for P2P content delivery functions.

The P2P module is relatively independent, which makes it easy to maintain and control.

BRIEF DESCRIPTION OF THE DRAWINGS

The abovementioned summary and the following detailed description may be better understood when combining with the drawings. It should be noted that the drawings are merely illustrative of the present disclosure. In the drawings, like reference numerals refer to the same or similar elements.

DETAILED DESCRIPTION

Figure 1:
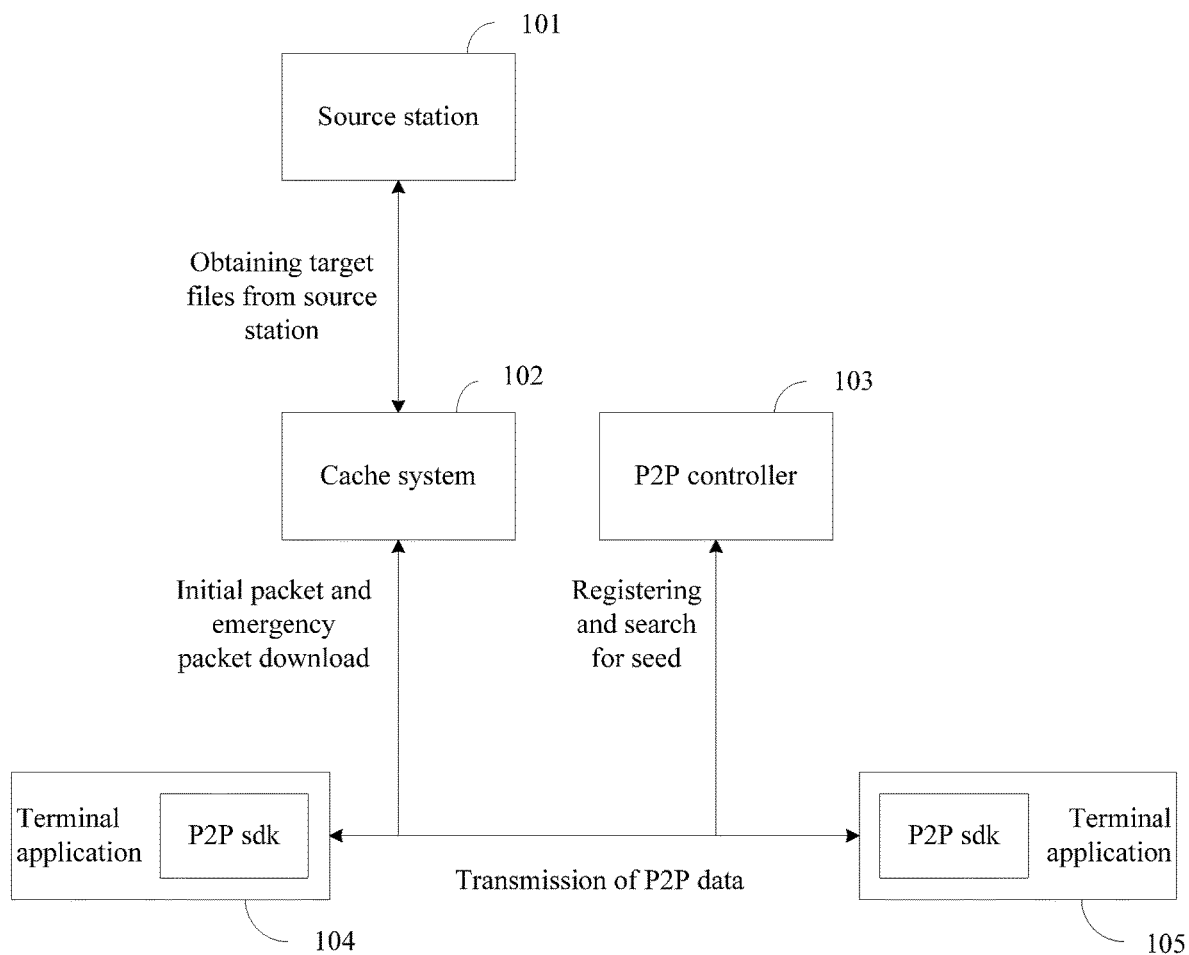
FIG. 1 illustrates an exemplary structure of a system consistent with the disclosed embodiments of the present disclosure.

In the following specific embodiments, the detailed features and advantages of the present disclosure are illustrated. The disclosure may enable any of those skilled in the art to understand and implement the technical content. Those skilled in the art can readily understand the objectives and advantages related to the present disclosure based on the detailed description, claims, and drawings of the present disclosure.

The present disclosure provides a method and a system for P2P content delivery used for mobile terminals. The key technical aspects of the method and the system may include the followings:

(1) No change may need to be made to the code structure and the service logic in the source servers.

(2) No change may need to be made to the code structure and the service logic in the cache system.

(3) A P2P sdk (software development kit) may be embedded into the terminal application, and the terminal application may import P2P traffic into P2P sdk through proxy.

(4) The terminal application may open the cache of the terminal application to the P2P sdk in the form of an interface, so that the sdk may effectively utilize the cache of the terminal application to provide P2P sharing, and double cache in a same application may be avoided.

(5) Smart data download method control (i): if the terminal application is a streaming media application, the current status (play, pause, and current play position) of the players may be notified to sdk through the interface provided by the sdk, the sdk may determine the method (http, P2P) to download the undownloaded data based on the notice and the current downloading progress.

(6) Smart data download method control (ii): by analyzing the download speed of the http portion, sdk may have an overall requirement of the entire download. As long as the P2P download speed is not lower than 80% of the http download speed, P2P download may be continuously implemented.

(7) Smart data download method control (iii): by analyzing the download speed of the http portion and the download quality of each P2P peer, only the P2P peers having a download speed higher than the http download speed and having a high quality may be selected for P2P downloading, and the number of concurrent P2P download may be determined accordingly.

(8) Smart data sharing control, when the mobile terminal uses a cellular network, having a battery power lower than 30%, having a CPU usage higher than 60%, and having a RAM usage higher than 80%, data sharing may be closed.

(9) Applying fragmented download on the target file. The portion of the file for P2P download may be selected for sequential fragmented download. When the portion of the file for P2P download cannot be completed, the remaining undownloaded portion of the file may be requested from the cache system or the source station as a continuous piece, in http method. An undesirable amount of small discontinuous fragments generated during the random downloading process may be avoided. Unnecessary resource consumption of the cache system or source station may be avoided.

(10) Exacting file names from the URL through suitable expressions and using the file names as the resource identifiers for the P2P download. Problems caused by different applications having different URL structures, and decreased versatility of the sdk caused by different URL structures may be avoided.

Details of the embodiments provided by the present disclosure are illustrated below in connection with the drawings.

FIG. 1 illustrates the structure of a system according to the embodiments of the present disclosure. The system may include a source station 101, a cache system 102, a P2P controller 103, a terminal application module 104 in a first mobile terminal, and a terminal application module 105 in a second mobile terminal. It should be noted that, the system should not be limited to two mobile terminals and the terminal applications in the two mobile terminals. The system may also be suitable for N mobile terminals and the application modules in the N mobile terminals.

Without changing the original service logic, the terminal application modules 104 and 105 may be embedded with a P2P software development kit (P2P sdk). The terminal application modules may send a request to the P2P sdk for P2P download. In one embodiment, the request may be forwarded to the P2P sdk through a proxy interface.

The P2P sdk may be the key module for implementing point to point transmission, and configured to implement P2P download and provide delivery of the response data, and further provide data sharing. The P2P sdk may be illustrated in detail as follows.

The P2P controller 103 may be configured to manage and recommend effective peers, search for download resources, and implement the technical aid for the NAT traversal of P2P. Further, the P2P controller 103 may also manage the P2P sdk, and the management may include at least the allocation of configuration information, and the collection and analysis of data.

The cache system 102 may often be arranged close to the ultimate user, to cache the data of the source station. In one embodiment, the cache system 102 may mainly provide the initial packet and the emergency packet for terminal application modules 104 and 105. In one embodiment, an initial packet may be the initial 256 KB fragment data of the target file to be download, and an emergency packet may be the data packet subsequently downloaded when the P2P download speed is too low to deliver data in time.

The source station 101 may be in charge of content management and deliver authority. If the content requested by a terminal application module has no backup in the cache system, the cache system 102 may forward the request to the source station 101, forward the response data to the terminal application module after receiving the response data, and cache the response data in the cache system 102. The next request, requesting for the same content, may be forwarded to the cache system to obtain data and may not need to be forwarded to the source station to request for data.

Figure 2:
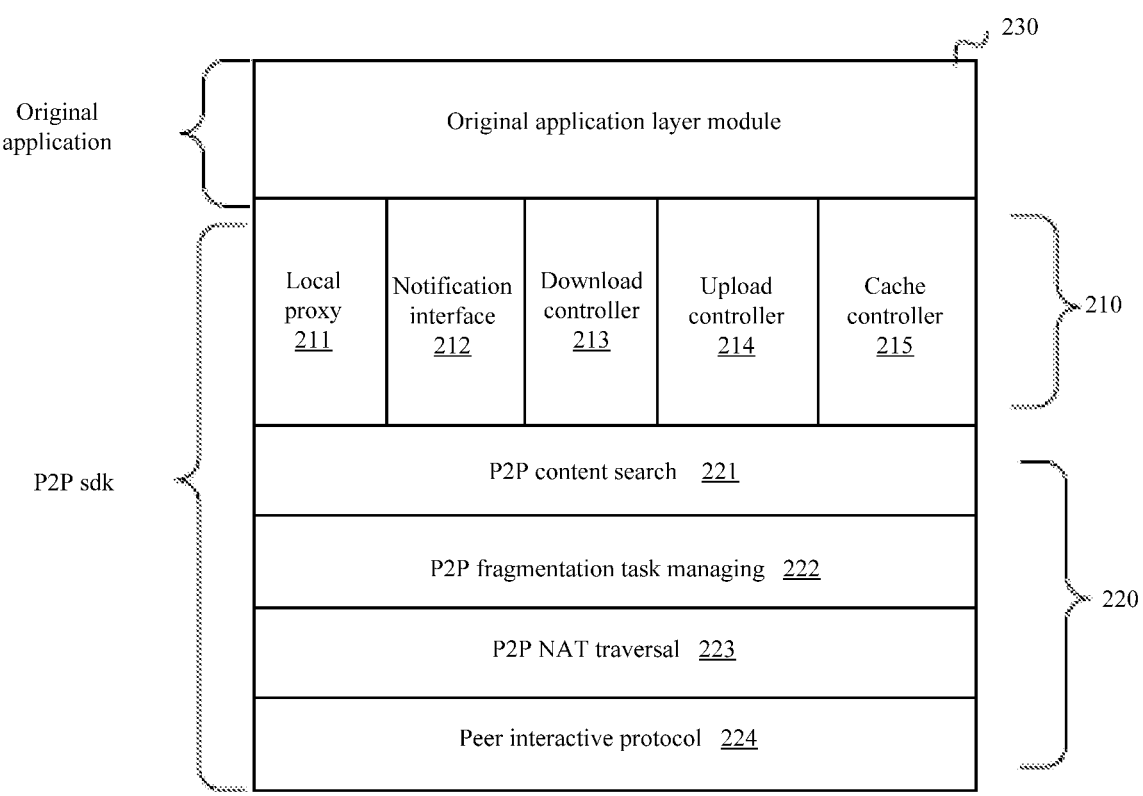
FIG. 2 illustrates a structure of an exemplary P2P software development kit consistent with the disclosed embodiments of the present disclosure.

FIG. 2 illustrates the structure of an exemplary P2P sdk provided by the present disclosure.

The P2P sdk may communication with the original application layer module 230 of a terminal application module. the P2P sdk may mainly include a P2P scheduling layer module 210 and a P2P protocol layer module 220. The P2P scheduling layer module 210 may include a local proxy interface module 211, a notification interface module 212, a download controller 213, an upload controller 214, and a cache controller 215.

The local proxy interface module 211 may be configured to import the data download request from the original application layer module 230 into P2P sdk, and forward the downloaded data to the original application layer module 230 through the interface module.

The notification interface module 212 may be configured to receive notifications associated with the status of the terminal application module. For example, current play position of the player, usable remaining time, play status (pause, play), etc. The status of the terminal application module may be used as a main consideration for data demand urgency.

The download controller 213 may be configured to determine if the data download request satisfies the condition to start P2P download, and determine the method (http or P2P) to download the next fragment of a virtual file based on configuration or current condition.

The upload controller 214 may be configured to determine if current cached data can be shared and the condition for sharing.

The cache controller 215 may be configured to manage local cache. For example, the cache controller 215 may control the scale of caching, sort the hotness of cached data and delete cached data, and manage the reuse of cache by the original application layer module 230.

The P2P protocol layer module 220 may include a P2P content search module 221, a P2P fragmentation task managing module 222, a P2P NAT traversal control module 223, and a peer interactive protocol module 224.

The P2P content search module 221 may be configured to implement the interactive management of P2P sdk and P2P controller 103, the entering and exiting of terminals, searching of downloaded content, and the processing of the recommendations and updates of peers the P2P controller sends to the terminals.

The entering and exiting of terminals, may refer to that the starting of the terminals requires the module to register the terminals through P2P, indicating the joining of new terminals. Similarly, the exiting of terminals may also need to be reported to the P2P controller that the terminals are marked as unavailable, such that the terminals may not be recommended to other terminals as peer terminals.

The P2P fragmentation task managing module 222 may be configured to implement task management of the registered P2P files and concurrently management of fragments, to realize optimized P2P download.

P2P NAT traversal control module 223 may be configured to ensure links among peers may be established. In one embodiment, the P2P NAT traversal control module 233 may mainly be in charge of successfully establishing communication links among peers under NAT environment.

The peer interactive protocol module 224 may be configured to implement communication protocols among peers.

Figure 3:
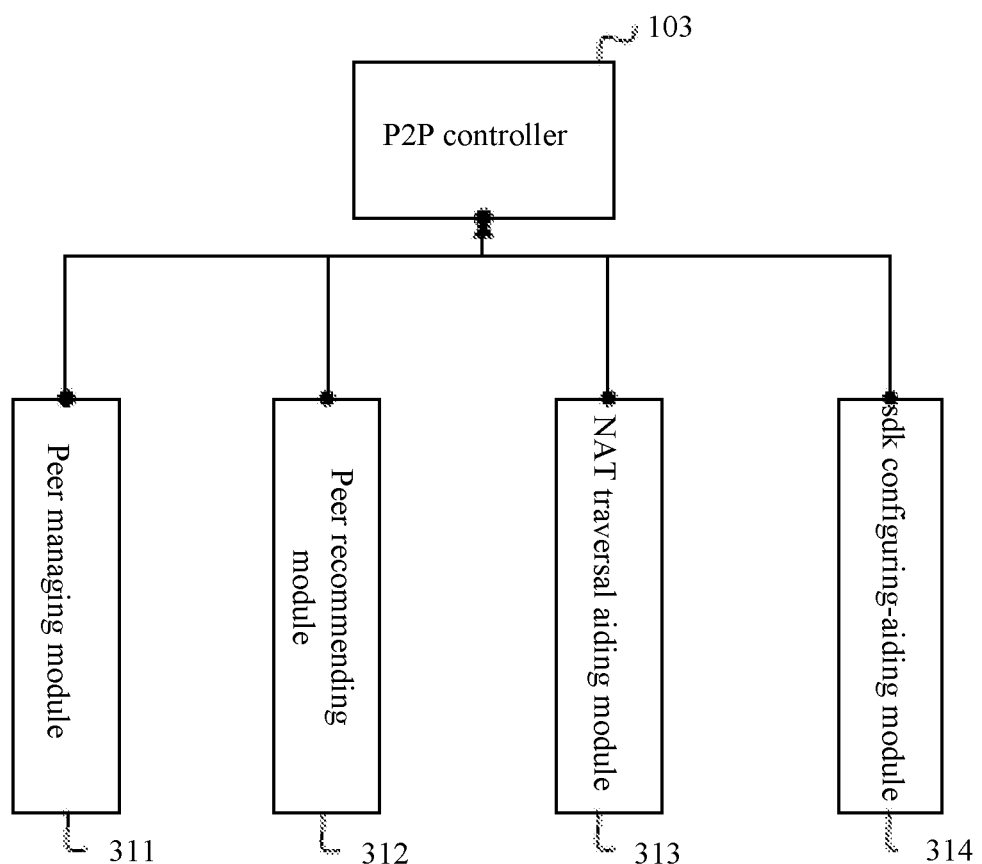
FIG. 3 illustrates a structure of an exemplary P2P controller consistent with the disclosed embodiments of the present disclosure.

FIG. 3 illustrates a structure of an exemplary P2P controller provided by the present disclosure.

The P2P controller 103 may include a peer managing module 311, a peer recommending module 312, a NAT traversal aiding module 313, and an sdk configuring-aiding module 314.

The peer managing module 311 may be configured to record and manage the activities of peers.

The peer recommending module 312 may be configured to recommend a proper and healthy peer list containing specific resources to the requestor that requests for data download. In one embodiment, the recommendation may be based on the locations of peers, level of healthiness, carrier ownership, NAT type, and other related criteria.

The NAT traversal aiding module 313 may be configured to aid a peer terminal to find out the NAT environment of the peer terminal, and may provide communication aid to establish connection among peers.

The sdk configuring-aiding module 314 may be configured to configure and manage the sdk. The configuring and managing may include configuring allocation, configuring change, connecting and analyzing the P2P data of the sdk. In one embodiment, the data may mainly refer to the P2P activity data, such as which requests utilizing P2P download, which requests utilizing http download, recording the reasons of download failure if P2P download fails, and so on.

Figure 4:
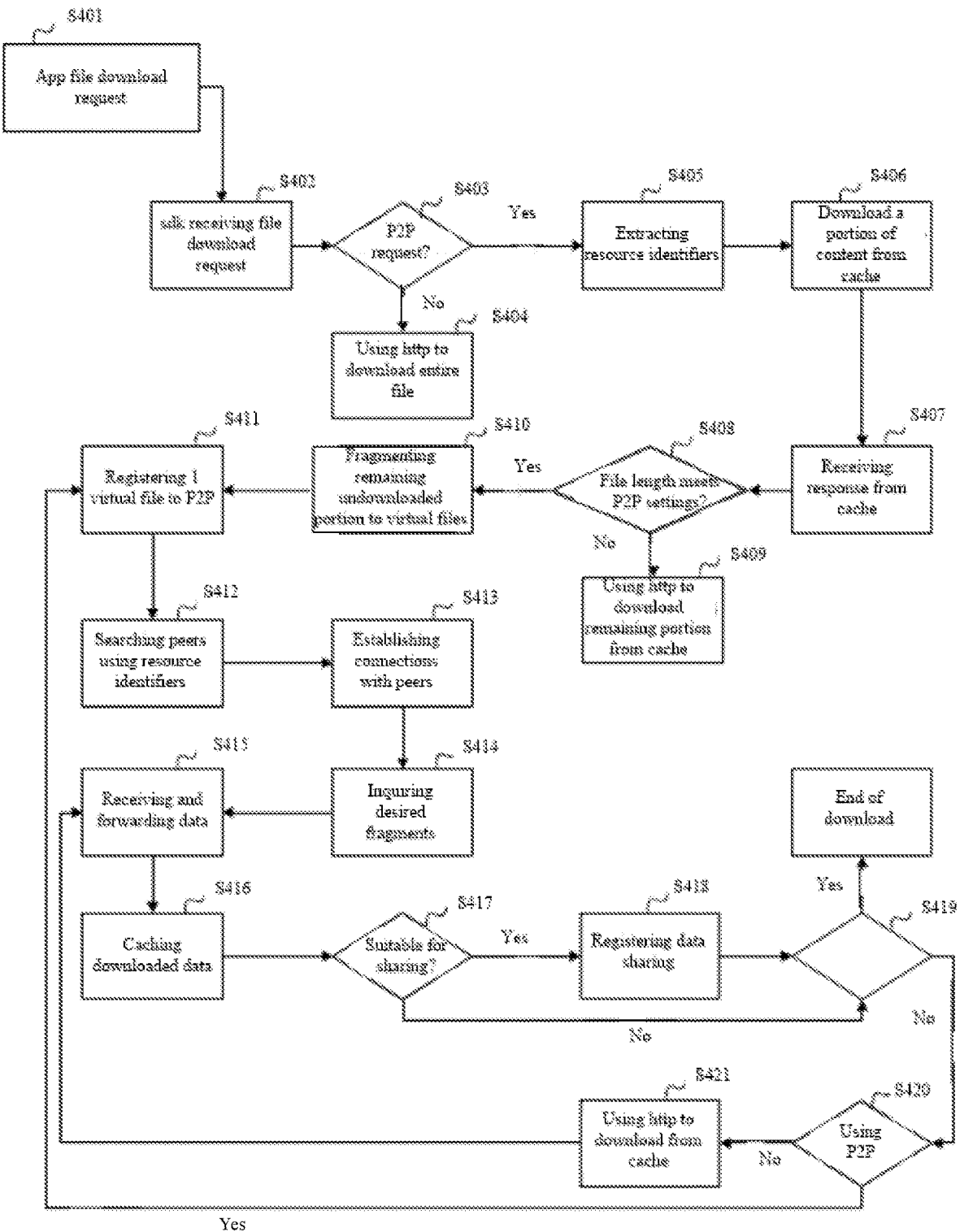
FIG. 4 illustrates an exemplary process of data downloading consistent with the disclosed embodiments of the present disclosure.

FIG. 4 illustrates a flow chart of an exemplary data download provided by the present disclosure.

In step S401: the application layer of the terminal application module may send a data download request, and the request may be imported to the P2P sdk through a proxy interface. In step S402: the local proxy interface of the sdk may receive the data download request.

In step S403, the download controller of the sdk may analyze the URL in the request, to determine if the request is a P2P request. For example, if the URL satisfies a predefined P2P URL method setting. If the URL doesn't satisfy the URL method setting, the process may proceed to step S404; if the URL satisfies the URL method setting, the process may proceed to step S405.

In step S404, the download controller of the sdk may utilize http method to download the complete data. For example, a regular proxy channel may be used to forward the request to the cache system or the source station. Also, response data from the cache system or the source station may be forwarded.

In step S405, the download controller of the sdk may extract a resource identifier based on a predefined method for extracting resource identifiers. The resource identifier may be the only identifiers used for subsequent search of P2P resources.

In step S406, the download controller of the sdk may reorganize a new request, i.e., a request to obtain an initial packet from the cache system or the source station, where the initial packet may be the initial packet of the data to be downloaded. In one embodiment, the request may be download request for obtaining a range having an initial packet with a length of 256 KB.

In step S407, the download controller of the sdk may receive the response data from the source station or the cache system.

In step S408, the download controller of the sdk may determine if P2P download may be started based on the response data. In one embodiment, the file length and the transfer encoding type of the data may be used to determine if P2P download may be started. If the condition is not satisfied, the process may proceed to step S409; if the condition is satisfied, the process may proceed to step S410 to start P2P download.

In step S409, the download controller of the sdk may send an http request to the cache system or the source station to download the remaining of the data.

In step S410, the P2P fragmentation managing module of the sdk may fragment the remaining of the undownloaded data to a plurality of virtual files.

In step S411, the P2P fragmentation managing module of the sdk may register one of the virtual files on the P2P task manager and may start P2P download.

In step S412, the P2P content search module of the sdk may use the resource identifier of the file to start a search on the P2P controller, if a peer list recommended by the P2P controller is received, the process may proceed to step S413; otherwise, P2P fails, the request for downloading the remaining of the file may be forwarded to the cache system or the source station, and corresponding response data may be delivered.

In step S413, the P2P NAT traversal control module of the sdk may establish connections with the recommended peers, and may establish communication links among peers through the NAT traversal aiding module of the P2P controller when necessary.

In step S414, the P2P fragmentation task managing module of the sdk may inquire desired resource fragments, i.e., current virtual files, from the peers after being successfully connected to peers. Also, the P2P download speed may be recorded, to provide necessary data for subsequent peer quality ranking and concurrent control.

In step S415, the local proxy interface module of the sdk may obtain the response data from the peers, and may first forward response data to the terminal application module.

In step S416, the cache controller of the sdk may cache the response data. If the caching of the response data reuses the cache of the terminal application, no cache needs to be implemented in the sdk; if the caching of the response data is implemented in the sdk, the setting of the cache controller and the current storage capacity of the terminal may be used to determine if sufficient storage capacity is available, if not available, the coldest shared file may be deleted for further caching a new file. In one embodiment, least recently used (LRU) algorithm may be used to delete the coldest shared file.

In step S417, the upload controller of the sdk may determine if data can be shared. In one embodiment, the upload controller may determine if the current terminal environment satisfies the settings for data sharing. The basis for such determination may mainly be a comprehensive evaluation of the network standard, current terminal battery power, current RAM usage, and other related information. If the data is determined to be suitable for sharing as seed, the process may proceed to step S418; if the data is not suitable for sharing, the process may proceed to download other virtual files.

In step S418, the upload controller of the sdk may register the data for sharing on the P2P controller, then wait for receiving the download requests from other peers, and prepare for downloading other virtual files.

In step S419, the download controller of the sdk may determine if the download is completed. If completed, the download may be ended, if not completed, the download may be continued.

In step S420, the download controller of the sdk may determine the download method of the next virtual file based on current situation. The basis for the determination may mainly be the notifications from the application layer and the control strategy of the download controller, and together with the current download situation, to determine the download method (obtaining data from the cache system or source station through http download, or through P2P download) of the next virtual file. That is, the main consideration may be if the current data download speed meets the timeliness of data delivery. If the current data download speed is not able to meet the requirements of application layer or the preset download requirements, http method may be used to directly send a download request for downloading data with a length of 256 KB, to the cache system or the source station (step S421). If the current data download speed meets the requirements, the download speed of all the peers in the current peer list may be detected and ranked to determine a usable peer list and determine a concurrent number of peers. Also, a corresponding number of virtual files may be registered in the P2P task manager. That is, step S411 and subsequent steps may be repeated.

The fragments may be downloaded consecutively according to the abovementioned method, and the download may be performed in a loop until completed. Thus, reliable data and timely delivery may be ensured, and at the same time P2P download may be maximized.

Figure 5:
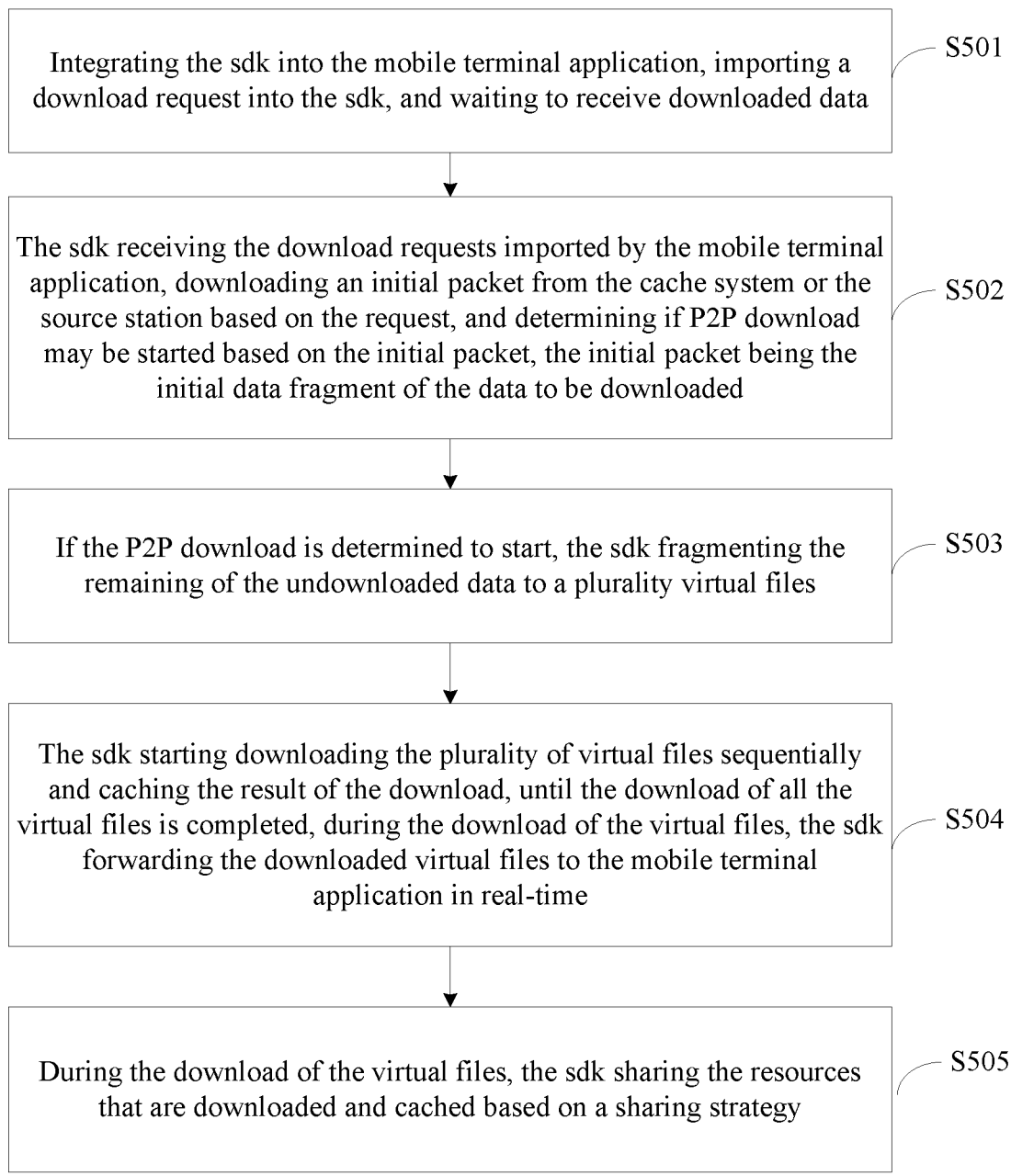
FIG. 5 illustrates an exemplary process of P2P content delivery used in a mobile terminal application consistent with the disclosed embodiments of the present disclosure.

FIG. 5 illustrates a flow chart of an exemplary P2P content delivery used in mobile terminal applications. The flow chart may include but not be limited to the following steps. In step S501: the mobile terminal application may be integrated with the sdk, and may import a download request into the sdk and wait to receive downloaded data.

In step S502, the sdk may receive the download request imported by the mobile terminal application, download an initial packet from the cache system or the source station based on the request, and determine if P2P download may be started based on the initial packet. The initial packet may be the initial data fragment of the data to be downloaded.

In step S503, if the P2P download is determined to start, the sdk may fragment the remaining undownloaded data to a plurality of virtual files.

In step S504, the sdk may start downloading the plurality of virtual files sequentially and cache the result of the download, until the download of all the virtual files is completed. During the download of the virtual files, the sdk may forward the downloaded virtual files to the mobile terminal application in real-time.

In step S505, during the download of the virtual files, the sdk may share the resources that are downloaded and cached based on a sharing strategy.

In one embodiment, the method that the mobile terminal application imports the download request to the sdk may include one of active proxy or passive hijacking.

In one embodiment, the method to download the virtual files may include using http protocol to download from the source station or the cache system and/or using P2P download; the sdk may calculate the download speed using http protocol and the download speed using P2P, and determine the method to download the current virtual file based on the demand of data by the mobile terminal application. If the desired virtual file cannot be downloaded through P2P or the download speed does not meet the regular demand of the mobile terminal application, and the P2P download speed is lower than http download speed, http may be used to directly download the file from the cache system or the source station, otherwise P2P may be used to download the data. In one embodiment, the method to obtain the demand of data by the mobile terminal application may include the sdk providing a data-usage-status notification interface to the mobile terminal application, to obtain the current consumption of data by the mobile terminal application.

In one embodiment, the sharing strategy may include, but may not be limited to, based on the network standard of the mobile terminal, the remaining battery power of the mobile terminal, the usage of RAM of the mobile terminal, and the usage of CPU of the mobile terminal, determining if the downloaded data may be used as seed for sharing; if the downloaded data is suitable for sharing, registering the data sharing, and waiting to receive download requests from other mobile terminal applications.

In one embodiment, determining whether P2P can be started may include: based on the length of the file described in the initial packet and the transfer coding type to determine if P2P can be started; if not suitable to start, sending an http request to the cache system and the source station, to download the remaining of the undownloaded data; if suitable to start, executing step S503.

A specific embodiment is now illustrated to describe the how present disclosure is implemented.

A specific application may be: a music application, using P2P to download all the files having a suffix of mp3 under the domain name download.a.com domain. The P2P sdk may share the cache of the app.

1. Performing Traffic Import and Traffic Filtering

P2P sdk may be embedded in the app, and sdk may be started. The sdk may monitor local 127.0.0.1:8888 to receive imported data. The regular matching expression of the P2P request of the app may be configured on the P2P controller: http://download.a.com/.*Vmp3, and the configuration may be issued to sdk. The application layer of the app may import the traffic downloaded through P2P to sdk, and the specific URL may be http://download.a.com/1.mp3. The sdk may start matching according to regular rules, and may enter P2P pre-inspection process if a match is located.

2. P2P Pre-Inspection Process

Requests may be reorganized, and a fragmentation request may be sent to the cache system or source station for downloading target 0-262143. After receiving a response, the value of the response header Content-Range field may be analyzed, and the length of the target may be determined to be 1435642, exceeding the minimum file length setting of the 1 MB P2P download. P2P may be determined to download the remaining of the undownloaded file. The sdk may forward the downloaded portion of the file to the application layer of the app. After forwarding the downloaded portion, the remaining of the undownloaded portion may be fragmented to 5 virtual files each having a length of 262144, and the length of the last file may be 124922.

3. Resource Identifier Extraction and Naming of Virtual Files

The rules for extracting the resource identifiers: http://download.a.com/$1\.mp3 of the app may be configured on the P2P controller. The sdk may extract the resource identifier 1.mp3 according to the rule, and may rename the files to be 1_01.mp3, 1_02.mp3, . . . , and 1_05.mp3. After the renaming, the download task of 1_01.mp3 may be registered on the P2P module.

4. P2P Download

P2P sdk may search resources of 1_01.mp3 on the P2P controller. The P2P controller may return the search results and return a peer list containing the resources. The sdk may start forming connections with all the peers in the list, divide the download targets to 64 KB fragments, and may send resource requests to the connected peers and start downloading. Meanwhile, the P2P controller may rank the download speed of the peers, so that optimal peers may be selected for downloading in subsequent download tasks.

5. Data Urgency Check and Method to Download

A player may call the sdk status notification interface to notify the sdk about the current play offset position. The sdk may analyze the downloaded mp3 files to obtain the time required for downloading the file, so as to determine if the downloaded data is sufficient to be played smoothly in the player. If the downloaded data can be played smoothly, the 1_0x.mp3 file may be registered to be P2P. If the cache does not have sufficient capacity, the virtual file may be switched to a regular range request for requesting data directly from the cache system, to alleviate the lack of cache.

6. The App and the P2P Sdk Sharing Cache

A cache locator (a md5 string) may be agreed between the app and the sdk. The locator may be arranged in the response header to be returned to the app. The app may open a standard cache extraction interface. The sdk may call the interface and may import the cache locator to obtain the complete cached files.

7. Cache Sharing

The sdk may complete downloading 1.mp3, and detect if current terminal is suitable for sharing. When the phone terminal uses WiFi network, and has a 90% remaining battery power, 56% of RAM usage, and 60% of CPU usage, the phone terminal is suitable for caching data for sharing. The sdk may register the resources for sharing on the P2P controller, and wait for resource download requests.

The terms and expressions used herein are for descriptive purposes only and the invention is not intended to be limited to these terms and expressions. The use of such terms and expressions is not intended to be exhaustive of the equivalent features of any illustration and description (or portions thereof), and it should be understood that any modifications from the present disclosure should also be included within the scope of the claims. Other modifications, variations, and substitutions may also occur. Accordingly, the claims should be construed to cover all such equivalents.

It should also be noted that, while the present invention has been described with reference to specific embodiments thereof, those skilled in the art should understand that the above examples are merely illustrative of the present invention and are not intended to be exhaustive. It should be understood by those skilled in the art that various changes in form and details may be made therein without departing from the spirit and scope of the present invention defined by the claims.

What is claimed is:

1. A system for content delivery in a mobile terminal application, comprising:
    a plurality of mobile terminal application modules, each mobile terminal application module being embedded with a software development kit (sdk), the sdk being configured to determine whether data download satisfies a start condition of P2P download, implement the P2P download, provide forwarding of response data, and provide data sharing; and
    a P2P controller, communicating with the plurality of mobile terminal application modules, the P2P controller being configured to manage the sdk, manage and recommend available peers, search resources for download, and aid NAT traversal of the P2P download, wherein the sdk includes:
    a P2P scheduling layer module and a P2P protocol layer module, the P2P scheduling layer module and the P2P protocol layer module having interactive communication with one another;
    the P2P scheduling layer module including:
        a local proxy interface module, configured to import a data download request from a mobile terminal application module into the sdk, and forward downloaded data to the mobile terminal application module through the local proxy interface module;
        a notification interface module, configured to receive notifications associated with a status of the mobile terminal application module;
        a download controller, configured to determine whether the data download request satisfies the start condition of the P2P download, and determine whether http download or the P2P download is to be used to download a next fragment of virtual file based on configuration or current condition; an upload controller, configured to determine whether current cached data is shared and a condition for sharing; and
    a cache controller, configured to manage a local cache, managing of the local cache including controlling a scale of caching, sorting a hotness of cached data and deleting the cached data, and managing a reuse of cache by the mobile terminal application module.

2. The system according to claim 1, wherein the P2P protocol layer module includes:
    a P2P content search module, configured to implement an interactive management of the sdk and the P2P controller, entering and exiting of mobile terminals, searching of downloaded content, and processing of recommendations and updates of peers by the P2P controller;
    a P2P fragmentation task managing module, configured to implement task management of registered P2P files and concurrently management of fragments, to realize optimized P2P download;
    a P2P NAT traversal control module, configured to ensure links among the peers are established; and
    a peer interactive protocol module, configured to facilitate communication protocols among the peers.

3. The system according to claim 1, wherein the P2P controller includes:
    a peer managing module, configured to record and manage activities of the peers;
    a peer recommending module, configured to recommend a proper and healthy peer list containing specific resources to a requestor that requests for data download;
    a NAT traversal aiding module, configured to aid a peer terminal to determine a NAT environment of the peer terminal, and provide communication aid to establish connection among peers; and
    a sdk configuring-aiding module, configured to configure and manage the sdk.

4. The system according to claim 1, wherein whether the data download request satisfies the start condition of the P2P download is determined by: based on a file length and a transfer encoding type of the data described in an initial packet, determining, by the download controller, whether the P2P download is started, when condition is not satisfied, sending an http request to a cache system or a source station to download remaining undownloaded data; and when the condition is satisfied, starting the P2P download.

5. The system according to claim 1, the download controller determining using http download or P2P download to download the next fragment of virtual file based on configuration or current condition includes:
    calculating, by the download controller, a download speed using an http method and a download speed using a P2P method, and determining a download method to download a current virtual file based on a demand of data by the mobile terminal application; when a virtual file is unable to be downloaded using the P2P method or the download speed using the P2P method does not meet a regular demand of the mobile terminal application, and the download speed using the P2P method is lower than the download speed using the http method, using the http method to directly download the current virtual file from the cache system or the source station, otherwise using the P2P method to download data of the current virtual file.

6. The system according to claim 5, wherein the download controller of the sdk is configured to determine a download method of a next virtual file, based on notifications from an application layer and a control strategy of the download controller, together with a current download situation.

7. The system according to claim 6, wherein the download method is determined as follows:
   if a current data download speed is unable to meet requirements of the application layer or preset download requirements, an http method is used to directly send a download request for downloading data with a length of 256 KB, to a cache system or the source station; and
   if the current data download speed meets the requirements of the application layer or the preset download requirements, download speeds of all peers in a current peer list are detected and ranked to determine a usable peer list and to determine a concurrent number of peers.

8. The system according to claim 1, wherein based on a network standard of the mobile terminal, a remaining battery power of the mobile terminal, a usage of RAM of the mobile terminal, and a usage of CPU of the mobile terminal, the upload controller determines whether the downloaded data is able to be used as seed for sharing; when the downloaded data is suitable for sharing, registering data for sharing, and waiting to receive download requests from other mobile terminal applications.

9. The system according to claim 1, wherein the local proxy interface module is configured to use one of an active proxy method and a passive hijacking method to import the data download request from the mobile terminal application module into the sdk.

10. The system according to claim 1, wherein the sdk is configured to provide a data-usage-status notification interface to the mobile terminal application to obtain a current consumption of data by the mobile terminal application.

11. A mobile terminal for a content delivery in a mobile network, comprising:
   a mobile terminal application comprising a system for the content delivery, the system comprising:
      a plurality of mobile terminal application modules, each mobile terminal application module being embedded with a software development kit (sdk), the sdk being configured to determine whether data download satisfies a start condition of P2P download, implement the P2P download, provide forwarding of response data, and provide data sharing; and
      a P2P controller, communicating with the plurality of mobile terminal application modules, the P2P controller being configured to manage the sdk, manage and recommend available peers, search resources for download, and aid NAT traversal of the P2P download, wherein the sdk includes:
   a P2P scheduling layer module and a P2P protocol layer module, the P2P scheduling layer module and the P2P protocol layer module having interactive communication with one another;
   the P2P scheduling layer module including:
      a local proxy interface module, configured to import a data download request from a mobile terminal application module into the sdk, and forward downloaded data to the mobile terminal application module through the local proxy interface module;
      a notification interface module, configured to receive notifications associated with a status of the mobile terminal application module;
      a download controller, configured to determine whether the data download request satisfies the start condition of the P2P download, and determine whether http download or the P2P download is to be used to download a next fragment of virtual file based on configuration or current condition;
      an upload controller, configured to determine whether current cached data is shared and a condition for sharing; and
      a cache controller, configured to manage a local cache, managing of the local cache including controlling a scale of caching, sorting a hotness of cached data and deleting the cached data, and managing a reuse of cache by the mobile terminal application module.

12. The mobile terminal according to claim 11, wherein the P2P protocol layer module includes:
   a P2P content search module, configured to implement an interactive management of the sdk and the P2P controller, entering and exiting of mobile terminals, searching of downloaded content, and processing of recommendations and updates of peers by the P2P controller;
   a P2P fragmentation task managing module, configured to implement task management of registered P2P files and concurrently management of fragments, to realize optimized P2P download;
   a P2P NAT traversal control module, configured to ensure links among the peers are established; and
   a peer interactive protocol module, configured to facilitate communication protocols among the peers.

13. The mobile terminal according to claim 11, wherein the P2P controller includes:
   a peer managing module, configured to record and manage activities of the peers;
   a peer recommending module, configured to recommend a proper and healthy peer list containing specific resources to a requestor that requests for data download;
   a NAT traversal aiding module, configured to aid a peer terminal to determine a NAT environment of the peer terminal, and provide communication aid to establish connection among peers; and
   a sdk configuring-aiding module, configured to configure and manage the sdk.

14. The mobile terminal according to claim 11, wherein whether the data download request satisfies the start condition of the P2P download is determined by: based on a file length and a transfer encoding type of the data described in an initial packet, determining, by the download controller, whether the P2P download is started, when condition is not satisfied, sending an http request to a cache system or a source station to download remaining undownloaded data; and when the condition is satisfied, starting the P2P download.

15. The mobile terminal according to claim 11, wherein wherein the download controller determining using http download or P2P download to download the next fragment of virtual file based on configuration or current condition includes:
   calculating, by the download controller, a download speed using an http method and a download speed using a P2P method, and determining a method to download a current virtual file based on a demand of data by the mobile terminal application; when a virtual file is unable to be downloaded using the P2P method or the download speed using the P2P method does not meet a regular demand of the mobile terminal application, and the download speed using the P2P method is lower than the download speed using the http method, using the http method to directly download the current virtual file from the cache system or the source station, otherwise using the P2P method to download data of the current virtual file.

16. The mobile terminal according to claim 11, wherein wherein based on a network standard of the mobile terminal, a remaining battery power of the mobile terminal, a usage of RAM of the mobile terminal, and a usage of CPU of the mobile terminal, the upload controller determines whether the downloaded data is able to be used as seed for sharing; when the downloaded data is suitable for sharing, registering data for sharing, and waiting to receive download requests from other mobile terminal applications.

17. The mobile terminal according to claim 11, wherein the local proxy interface module is configured to use one of an active proxy method and a passive hijacking method to import the data download request from the mobile terminal application module into the sdk.

18. The mobile terminal according to claim 11, wherein the sdk is configured to provide a data-usage-status notification interface to the mobile terminal application to obtain a current consumption of data by the mobile terminal application.

* * * * *